Oct. 15, 1929.   A. E. ANDERSON   1,731,965
AUTOMATIC RECLOSING CIRCUIT BREAKER SYSTEM
Original Filed Jan. 25, 1927
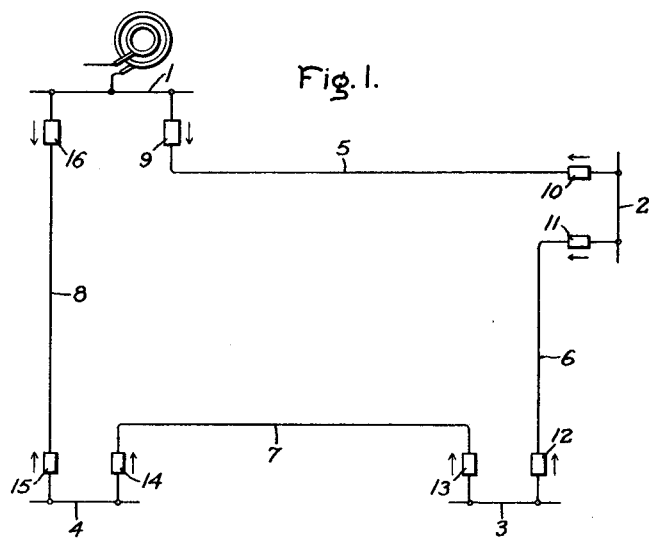
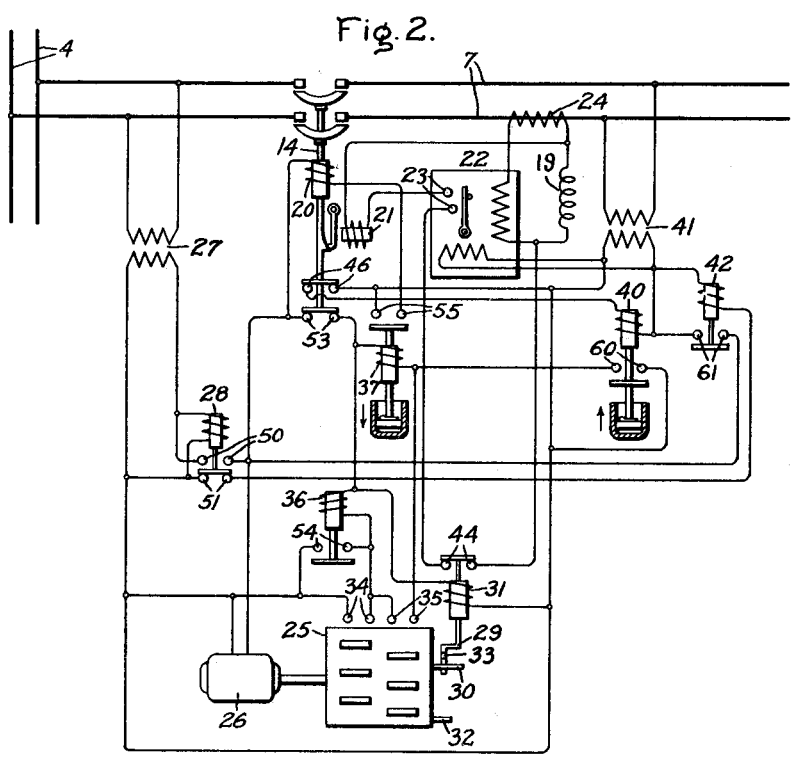
Inventor;
Arvid E. Anderson,
by
His Attorney Patented Oct. 15, 1929

1,731,965

UNITED STATES PATENT OFFICE

ARVID E. ANDERSON, OF SCOTIA, NEW YORK, ASSIGNOR TO GENERAL ELECTRIC COMPANY, A CORPORATION OF NEW YORK

AUTOMATIC RECLOSING CIRCUIT-BREAKER SYSTEM

Application filed January 25, 1927, Serial No. 163,533. Renewed April 30, 1929.

My invention relates to automatic reclosing circuit breaker systems and particularly to an arrangement adapted for controlling the reclosing of a circuit breaker in a circuit connecting together two alternating current substation busses. In order to maintain continuity of service it is customary to connect the substation busses of a transmission system in a loop circuit the ends of which are supplied either from a single supply bus or from separate supply busses and one object of my invention is to provide an arrangement for controlling the operation of a circuit breaker under the conditions which obtain in such a system.

My invention will be better understood from the following description taken in connection with the accompanying drawing and its scope will be pointed out in the appended claims.

In the accompanying drawing Fig. 1 is a one-line drawing of a transmission system to which my invention is particularly applicable and Fig. 2 is a diagram of a control system for a circuit breaker embodying my invention.

Referring to Fig. 1, which is a one-line diagram of a loop system, 1 is a supply bus and 2, 3 and 4 are substation busses which are connected in a loop by the circuits 5, 6, 7, and 8. The circuit 5 which interconnects the busses 1 and 2 has a circuit breaker 9 therein adjacent to the bus 1 and a circuit breaker 10 therein adjacent to the bus 2. Similarly the circuit 6, which interconnects the busses 2 and 3, has a circuit breaker 11 therein adjacent to the bus 2 and a circuit breaker 12 adjacent to the bus 3; the circuit 7, which interconnects the busses 3 and 4, has a circuit breaker 13 therein adjacent to the bus 3 and a circuit breaker 14 therein adjacent to the bus 4; and the circuit 8, which interconnects the busses 4 and 1, has a circuit breaker 15 therein adjacent to the bus 4 and a circuit breaker 16 adjacent to the bus 1.

Suitable selective means, examples of which are well known in the art, may be provided whereby a fault on any circuit will only effect the opening of the circuit breakers adjacent to the faulty circuit. For example, if a fault should occur in circuit 7, only the circuit breakers 13 and 14 would be opened, whereas, if the fault should occur in circuit 6, only the circuit breakers 11 and 12 would be opened. One well known way of obtaining this selective action is to provide each circuit breaker with means for effecting the opening thereof when the power flow through it is of a certain value and duration and in the direction shown by the arrow adjacent thereto in Fig. 1.

In order to maintain continuity of service it is very desirable to arrange the various circuit breakers so that they are automatically reclosed after they have been opened by a faulty circuit and my invention relates particularly to an arrangement for controlling the circuit breakers such as 11, 12, 13 and 14 which are in the circuits interconnecting the substation busses.

The control arrangements for closing the other circuit breakers may be of any suitable type examples of which are well known in the art. In practice the circuit breakers 9 and 16 are usually manually closed, but they may be arranged in any suitable manner so as to be reclosed automatically a predetermined number of times whenever the station bus 1 is energized. Since it is desirable to have the circuit breakers 10 and 15 closed only when the circuits 5 and 8 respectively are energized it is customary to arrange these circuit breakers in a manner well known in the art so that they are reclosed only when the respective circuits, in which they are connected, are energized.

Fig. 2 shows an arrangement embodying my invention which may be used for controlling the circuit breakers 11 to 15 inclusive in Fig. 1. For the purpose of this description it will be assumed that the circuit breaker shown in Fig. 2 is the circuit breaker 14 which in Fig. 1 connects the circuit 7 to the bus 4.

As shown in Fig. 2 the circuit breaker 14 is of the well known latched-in type comprising a closing magnet 20 and a tripping magnet 21 but it is obvious that it may be of any other suitable type, examples of which are well known in the art. For effecting the opening of the circuit breaker 14 when an excessive amount of power flows through circuit breaker from the bus 4 to the circuit 7 I provide a power directional relay 22 which is energized in accordance with the power flowing through the circuit 7 and which is arranged to close its contacts 23 when the direction of the power flow is from the bus 4 to the circuit 7 and the current exceeds a predetermined amount. The contacts 23 are in the circuit of the tripping magnet 21 which is supplied from a current transformer 24 in the circuit 7. As shown the tripping magnet 21 is arranged to be connected in parallel with a reactor 19 which is in series with the current coil of the power directional relay but it may be energized from any other suitable source. When the circuit breaker 14 is opened due to a fault on the circuit 7 it is desirable to reclose the circuit breaker a plurality of times with predetermined time intervals between successive reclosures and to prevent further reclosures if the fault still exists after the circuit breaker has been reclosed a predetermined number of times.

Such arrangements are well known in the art and in the drawing I have shown one of the well known reclosing arrangements for accomplishing this result. This reclosing arrangement comprises a timer 25 and a driving motor 26 therefor which is arranged to be supplied from the bus 4 through a transformer 27 when the voltage relay 28 which is connected across the secondary of the transformer 27 is energized. The motor 26 is normally prevented from rotating by a stop 29 which engages a projection 30 on the timer. The stop 29 is arranged to be moved out of engagement with the projection 30 by a release magnet 31 when it is energized. This magnet 31 is arranged to be energized when the circuit breaker 14 is open. The stop 29 is also arranged to engage another projection 32 on the timer when the magnet 31 is energized and the timer is in a predetermined position. This position is called the lockout position and when the timer is held in this position by the stop 31, further operation of the timer to effect a reclosure of the circuit breaker 14 is prevented although the circuit breaker 14 may be open. The stop 29 is provided with a groove 33 which is so spaced that the projection 32 is in this groove when the timer is held in the lockout position. Consequently the release magnet 31 is also prevented from returning to its deenergized position if its coil is deenergized after the timer is locked out.

The timer 25 is provided with the two sets of contacts 34 and 35 which are arranged to be closed in a predetermined sequence as the timer is rotated and so that only one set is closed at an instant. When the contacts 34 are closed a circuit is completed for a control relay 36 if the circuit breaker 14 is open, and the relay 36 when energized completes a locking circuit for itself so that when the contacts 34 are subsequently opened, the relay remains energized so long as the circuit breaker remains open. When the contacts 35 are closed a circuit is completed for a suitable control relay 37, shown as a hesitating control relay, if the control relay 36 is energized. The energization of the control relay 37 completes a circuit of the closing coil 20 to close the circuit breaker 14.

Whenever the circuit 7 is energized at substantially normal voltage it is desirable to have the circuit breaker 14 closed even though the timer 25 may be in its lockout position. For accomplishing this result I provide a voltage relay 40 which is energized from the circuit 7 through a transformer 41 and which is arranged to effect the energization of the hesitating control relay 40 when the circuit 7 is energized for a certain length of time. While I have shown a single phase time delayed voltage relay it is obvious that other suitable devices may be used to indicate that the circuit 7 is energized and the conditions thereof are normal.

In order that the hesitating control relay 37 and the closing coil 20 may be energized to effect the closing of the circuit breaker 14 when only the circuit 7 is energized, a transfer relay 42 is provided. This relay is arranged to be energized from the secondary of the transformer 41 when the relay 28 is deenergized. When relay 42 is energized, it transfers the connections of the relay 37 and closing coil 20 so that they are energized from the secondary of the transformer 41.

Circuit interrupters are usually rated for a certain duty cycle and after they have completed this duty cycle it is not desirable to have them open again under load until after they have been inspected. Therefore, in the arrangement shown in the drawing it may be desirable not to have the circuit breaker 14 open again after it has been locked out due to the action of relay 25, although it is desirable to have it reclose again due to the action of relay 40. Therefore, in order to accomplish this result it is necessary to prevent the directional overload relay 22 from effecting the opening of the circuit breaker 14 after it has been locked out and then subsequently reclosed by the operation of the voltage relay 40. In the arrangement shown this result is obtained by providing the release magnet 31 with contacts 44 which are so connected in the circuit of the tripping magnet 21 that the closing of the contacts 23 of the relay 22 when the release magnet is in its energized position does not complete the circuit of the tripping magnet.

The operation of the arrangement shown is as follows: Under normal operating conditions the circuit breaker 14 is held in its closed position and the voltage relay 28 is in its energized position since the bus 4 is energized. The motor 26 of the timer 25 is connected across the secondary of the transformer 27 but the timer 25 is prevented from rotating since the projection 30 is in engagement with the stop 29. The time relay 40 and the control relay 42 are in their deenergized positions since the circuit of the relay 40 is open at the auxiliary contacts 46 on the circuit breaker 14 and the circuit of the relay 42 is open at the contacts 51 of relay 28. The control relays 36 and 37 are in their deenergized positions since the auxiliary contacts 53 on the circuit breaker 14 are open. When a fault occurs on the circuit 7 and an excessive current flows from the bus 4 to the circuit 7, the relay 22 closes its contacts 23 so that tripping magnet 21 is energized and the circuit breaker 14 is opened. The fault on the circuit 7 also causes the circuit breaker 13 (Fig. 1) to open so that the circuit 7 becomes deenergized.

The closing of the auxiliary contacts 53 connects the release magnet 31 of the timer 25 across the secondary of the transformer 27 if the bus 4 is energized. The circuit of the magnet 31 also includes the contacts 50 of the voltage relay 28. The energization of the release magnet 31 causes the stop 29 to be moved out of engagement with the projection 30 so that timer 25 is free to rotate. When the timer closes its contacts 34 a circuit for the control relay 36 is completed across the secondary of the transformer 27. This circuit also includes the auxiliary contacts 53 on the circuit breaker 14 and the contacts 50 of relay 28. The relay 36 by closing its contacts 54 completes a locking circuit for itself which is independent of the timer contacts 34 so that the relay 36 remains energized after the timer opens its contacts 34. When the timer 25 subsequently closes its contacts 35 a circuit is completed for the hesitating control relay 37. This circuit is from one terminal of the secondary of the transformer 27 through contacts 50 of the relay 28, auxiliary contacts 53 on circuit breaker 14, coil of relay 37, timer contacts 35, contacts 54 of relay 36 to the other terminal of secondary of the transformer 27. The hesitating control relay 37, by closing its contacts 55 completes the circuit of the closing coil 20 across the secondary of the transformer 27 so that the circuit breaker 14 closes. The opening of the auxiliary contacts 53 on the circuit breaker 14 deenergizes the control relay 36 and 37 and the release magnet 31. The control relay 36 and the release magnet return substantially instantaneously to their deenergized positions, but the control relay 37 remains in its energized position for a short interval after its winding is deenergized so as to insure that the closing coil is sufficiently energized to close the circuit breakers completely.

If the faulty condition still exists on the circuit 7 when the circuit breaker 14 is reclosed the relay 22 operates again to effect the opening of the circuit breaker and the above described operation is repeated so that the circuit breaker 14 is reclosed a predetermined number of times with predetermined intervals between successive reclosures.

If the circuit breaker 14 opens within a predetermined time after it has been reclosed a predetermined number of times so that the release magnet 31 is energized when the timer 25 reaches its lockout position, the projection 32 on the timer is moved into the groove 33 in the stop 29 so that the timer 25 is stopped and the release magnet 31 is prevented from returning to its deenergized position in case its winding is subsequently deenergized. The timer 25 is, therefore, prevented from effecting further reclosing of the circuit breaker until the release magnet is reset by hand.

It will be observed that, if the circuit breaker 14 remains closed after any reclosure prior to timer being locked out, the timer is not locked out when it reaches its lockout position since the release magnet is deenergized when the timer reaches that position and, therefore, the projection 32 does not engage the stop 29. The timer 25 merely continues to rotate until it reaches its normal position where it is stopped by the projection 30 engaging the stop 29.

If after the timer 25 has been locked out, the fault on the circuit 7 is removed and the circuit is reenergized by the closing of the circuit breaker 13 at the other end thereof, it is desirable to effect the reclosure of the circuit breaker 14 so as to restore continuity of service to the bus 4 in case the circuit 8 is also out of order. As mentioned above, however, it is not desirable to have the circuit breaker 14 open again in response to an overload until after it has been inspected since it may already have completed the duty cycle on which it was rated.

If the voltage across the circuit 7 is restored to normal after the timer 25 is locked out, the relay 40 closes its contacts 60 and completes a circuit for the hesitating control relay 37 to effect the closing of the circuit breaker. If the bus 4 is energized, the closing of contacts 60 of the relay 40 completes the circuit of the relay 37 across the secondary winding of the transformer 27 through contacts 50 of relay 28 and auxiliary contacts 53 on the circuit breaker 14. If the bus 4 is not energized, the circuit of the relay 37 is completed across the secondary of the transformer 41 through contacts 61 of relay 42 and auxiliary contacts 53 on the circuit breaker 14.

It will be observed that even though the circuit breaker can be reclosed by the operation of the voltage relay 40 while the timer 25 is in its locked out position, the circuit breaker cannot be opened again by a fault on the circuit 7 so long as the timer 25 is held on its lockout position because the circuit of the tripping magnet 21 is open at contacts 44 of the release magnet 31.

While I have in accordance with the Patent Statutes shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States, is:

1. In an automatic reclosing circuit breaker system, two electric circuits, a circuit breaker connecting said circuits together, means for effecting the opening of said circuit breaker, reclosing means for said circuit breaker arranged when one of said circuits is energized and the other is deenergized to effect a predetermined number of reclosures of said circuit breaker, means for preventing said reclosing means from effecting further reclosing of said circuit breaker after it has reclosed said predetermined number of times, and means responsive to the magnitude of the voltage of said other circuit for effecting the reclosing of said circuit breaker irrespectively of the number of times said circuit breaker has been reclosed when the magnitude of said voltage is above a predetermined value.

2. In an automatic reclosing circuit breaker system, two electric circuits, a circuit breaker connecting said circuits together, power directional means for effecting the opening of said circuit breaker when the current flowing through said circuit breaker from one of said circuits to the other exceeds a predetermined value, reclosing means, for said circuit breaker arranged when said one of said circuits is energized and the other is deenergized to effect a predetermined number of reclosures of said circuit breaker, means for preventing said reclosing means from effecting further reclosing of said circuit breaker if it fails to remain closed a predetermined length of time after being reclosed said predetermined number of times, and means responsive to a predetermined magnitude of the voltage of said other circuit for effecting the reclosing of said circuit breaker irrespectively of the number of times said circuit breaker has been reclosed when the magnitude of said voltage is above a predetermined value.

3. In an automatic reclosing circuit breaker system, two electric circuits, a circuit breaker connecting said circuits together, means for effecting the opening of said circuit breaker, reclosing means for said circuit breaker arranged when one of said circuits is energized and the other is deenergized to effect a predetermined number of reclosures of said circuit breaker, means for preventing said reclosing means from effecting further reclosing of said circuit breaker and for preventing said opening means from effecting the opening of said circuit breaker after it has been reclosed said predetermined number of times, and means responsive to the energization of said other circuit for effecting the reclosing of said circuit breaker irrespectively of the number of times said circuit breaker has been reclosed.

4. In an automatic reclosing circuit breaker system, two electric circuits, a circuit breaker connecting said circuits together, means for effecting the opening of said circuit breaker when the current flowing through said circuit breaker from one of said circuits to the other exceeds a predetermined value, reclosing means for said circuit breaker arranged when said one of said circuits is energized and the other is deenergized to effect a predetermined number of reclosures of said circuit breaker, means for preventing said reclosing means from effecting further reclosing of said circuit breaker and for preventing said opening means from effecting the opening of said circuit breaker if said circuit breaker opens within a predetermined time after being reclosed said predetermined number of times, and means responsive to the voltage of said other of said circuits for effecting the reclosing of said circuit breaker irrespectively of the number of times said circuit breaker has been reclosed.

5. In an automatic reclosing circuit breaker system, two electric circuits, a circuit breaker connecting said circuits together, means for effecting the opening of said circuit breaker, a timer arranged to be operated in response to the opening of said circuit breaker when one of said circuits is energized and the other is deenergized to effect a predetermined number of reclosures of said circuit breaker, means for locking said timer in a predetermined position if said circuit breaker is open when said timer reaches said predetermined position, and means responsive to the magnitude of the voltage of said other of said circuits for effecting the reclosing of said circuit breaker irrespectively of the position of said timer when the magnitude of said voltages is above a predetermined value.

6. In an automatic reclosing circuit breaker system, two electric circuits, a circuit breaker connecting said circuits together, overload responsive means for effecting the opening of said circuit breaker, a timer adapted to effect a predetermined number of reclosures of said circuit breaker, means responsive to the opening of said circuit breaker for effecting the operation of said timer, means for maintaining said timer in a position in which it does not effect the reclosing of said circuit breaker if said circuit breaker is open when the timer reaches said position, and means responsive to a predetermined magnitude of the voltage of one of said circuits for effecting the reclosure of said circuit breaker irrespectively of the position of said timer.

7. In an automatic reclosing circuit breaker system, two electric circuits, a circuit breaker connecting said circuits together, overload responsive means for effecting the opening of said circuit breaker, a motor driven timer adapted to effect a predetermined number of reclosures of said circuit breaker, means responsive to the opening of said circuit breaker for effecting the operation of said timer, means arranged to lock said timer in a predetermined position if said circuit is open when said timer reaches said position, means for preventing said overload responsive means from effecting the opening of said circuit breaker when said timer is in said locked position, and means for effecting the closing of said circuit breaker irrespectively of the position of said timer.

8. In an automatic reclosing circuit breaker system, two electric circuits, a circuit breaker connecting said circuits together, overload responsive means in one of said circuits for effecting the opening of said circuit breaker, a timer adapted to effect a plurality of reclosures of said circuit breaker, means responsive to the opening of said circuit breaker for effecting the operation of said timer, and means arranged to be operated when said circuit breaker is open and said timer reaches a predetermined position after effecting a predetermined number of reclosures of said circuit breaker to prevent said overload responsive means when operated in response to a subsequent reclosure of said circuit breaker from effecting the opening of said circuit breaker.

9. In an automatic reclosing circuit breaker system, two electric circuits, a circuit breaker connecting said circuits together, overload means for effecting the opening of said circuit breaker, a timer adapted to effect a predetermined number of reclosures of said circuit breaker, a motor normally tending to move said timer, a magnet arranged when deenergized to stop said timer in one position and when energized to stop said timer in another position, means responsive to the opening of said circuit breaker for effecting the energization of said magnet to permit said timer to move from said first mentioned position, and means controlled by said magnet for preventing said overload responsive means from effecting the opening of said circuit breaker when said magnet is in its energized position.

10. In an automatic reclosing circuit breaker system, two electric circuits, a circuit breaker connecting said circuits together, means for effecting the opening of said circuit breaker, a timer adapted to effect a predetermined number of reclosures of said circuit breaker, means responsive to the opening of said circuit breaker for effecting the operation of said timer, a magnet arranged when energized to stop said timer in a predetermined position, a circuit for said magnet arranged to be completed when said circuit breaker is open, and means controlled by said magnet for preventing said overload responsive means from effecting the opening of said circuit breaker when said magnet is in its energized position.

11. In an electric system comprising a plurality of busses, an electric circuit for connecting together two of said busses, a circuit breaker at each end of said circuit, power directional means associated with each circuit breaker for effecting the opening thereof when the current flowing through it from the adjacent bus to the circuit exceeds a predetermined value, and reclosing means associated with each circuit breaker for effecting a predetermined number of reclosures thereof when the adjacent bus is energized and the circuit is deenergized and for effecting the reclosure of said circuit breaker irrespectively of the number of times said circuit breaker has been reclosed when said circuit is energized.

12. In an electric system a plurality of busses, circuits for connecting said busses in series, a circuit breaker in each circuit at each end thereof, means associated with each circuit breaker for effecting the opening thereof when the power flowing therethrough exceeds a predetermined value, and reclosing means associated with certain of said circuit breakers for effecting th reclosing thereof a predetermined number of times when the respective circuits are deenergized and for effecting the reclosing thereof irrespectively of the number of times they have been reclosed when the respective circuits are energized.

13. In an automatic reclosing circuit breaker system, two electric circuits, a circuit breaker connecting said circuits together, means for effecting the opening of said circuit breaker, reclosing means for said circuit breaker arranged when one of said circuits is energized and the other is deenergized to effect a predetermined number of reclosures of said circuit breaker, means for preventing said reclosing means from effecting further reclosing of said circuit breaker after it has been reclosed said predetermined number of times, and means responsive to magnitude of the voltage of said other circuit upon the reenergization thereof for effecting the reclosing of said circuit breaker irrespectively of the number of times said circuit breaker has been reclosed when the magnitude of said voltage is above a predetermined value.

14. In an automatic reclosing circuit breaker system, two electric circuits, a circuit breaker connecting said circuits together, power directional means for effecting the opening of said circuit breaker in response to the flow of energy from one of said circuits to the other, reclosing means for said circuit breaker arranged when said one of said circuits is energized and the other is deenergized to effect a predetermined number of reclosures of said circuit breaker, means for preventing said reclosing means from effecting further reclosing of said circuit breaker after it has been reclosed said predetermined number of times, and means responsive to a predetermined electrical condition of said other circuit upon the reenergization thereof for effecting the reclosing of said circuit breaker irrespectively of the number of times said circuit breaker has been reclosed.

In witness whereof, I have hereunto set my hand this 24th day of January, 1927.

ARVID E. ANDERSON.